US008138247B2

(12) United States Patent
Shinohara et al.

(10) Patent No.: US 8,138,247 B2
(45) Date of Patent: Mar. 20, 2012

(54) POLYOXYMETHYLENE COMPOSITIONS AND ARTICLES MADE FROM THESE

(75) Inventors: Kenichi Shinohara, Tochigi (JP); Maiko Shibuya, Tochigi (JP)

(73) Assignee: E.I. du Pont de Nemours and Company, Wilmington, DE (US)

( * ) Notice: Subject to any disclaimer, the term of this patent is extended or adjusted under 35 U.S.C. 154(b) by 220 days.

(21) Appl. No.: 12/548,672

(22) Filed: Aug. 27, 2009

(65) Prior Publication Data

US 2010/0056698 A1 Mar. 4, 2010

Related U.S. Application Data

(60) Provisional application No. 61/092,893, filed on Aug. 29, 2008.

(51) Int. Cl.
*C08K 5/34* (2006.01)

(52) U.S. Cl. ........ 524/106; 524/505; 524/512; 524/517; 524/521

(58) Field of Classification Search .................. 524/106, 524/505, 512, 517, 521
See application file for complete search history.

(56) References Cited

U.S. PATENT DOCUMENTS 5,011,890 A 4/1991 Novak
5,346,737 A * 9/1994 Takahashi et al. ........... 428/36.9
5,418,286 A 5/1995 Takahashi et al.
5,866,671 A 2/1999 Shinohara et al.
2005/0288438 A1 12/2005 Nandi
2007/0073007 A1 * 3/2007 Harashina ..................... 525/472
2007/0078204 A1 4/2007 Komatsu et al.

FOREIGN PATENT DOCUMENTS

EP 1 688 461 8/2006
WO WO93/11206 6/1993
WO PCT/US/2009/055492 10/2009

* cited by examiner

*Primary Examiner* — Peter D Mulcahy
(74) *Attorney, Agent, or Firm* — Loretta Smith

(57) ABSTRACT

Polyoxymethylene compositions comprising (a) 20 to 80 weight percent polyacetal homopolymer, copolymer, or mixtures of these; (b) 5 to 40 weight percent glass fiber; (c) 0.1 to 2 weight percent polymeric thermal stabilizer selected from the group consisting of polyacrylamide, polymethacrylamide, and mixtures of these; (d) 0.02 to 2 weight percent allantoin; and 0.1 to 5 weight percent of an ethylene copolymer of the formula E/X/Y; wherein Y includes a glycidyl group. Articles made from these compositions.

4 Claims, No Drawings

POLYOXYMETHYLENE COMPOSITIONS AND ARTICLES MADE FROM THESE

CROSS REFERENCE TO RELATED APPLICATIONS

This application claims priority under 35 U.S.C. 119(e) to U.S. Provisional App. No. 61/092,893, filed 29 Aug. 2008 expired.

FIELD OF INVENTION

The present invention relates to polyoxymethylene resin compositions comprising allantoin and ethylene copolymers.

BACKGROUND OF INVENTION

Polyoxymethylene (POM, also known as polyacetal) has excellent tribological characteristics, hardness, stiffness, moderate toughness, low coefficient of friction, good solvent resistance, and the ability to crystallize rapidly, making polyoxymethylene resin compositions useful for preparing articles for use in many demanding applications. However, during melt-processing, polyoxymethylenes can degrade and release formaldehyde. For this reason, formaldehyde evolution, measured as thermally evolved formaldehyde (TEF) is often used to determine the heat stability of polyoxymethylene compositions. Other methods for assessing the heat stability of polyoxymethylene include the measurement of weight loss in air over aging at elevated temperatures for prolonged periods, such as 500 to 1000 hrs and the observation of degradative coloration of the resin compositions using the Yellowness index, as defined in ASTM E313-73 (D 1925).

In the manufacture of automobile interior parts, reducing emission of volatile organic compounds (VOC) such as formaldehyde increasingly demanded. It would be desirable to have polyoxymethylene compositions, especially used in automobile interior parts that exhibited good or excellent thermal stability during melt-processing and aging, as assessed by one or more of the above-mentioned methods.

U.S. Pat. No. 5,011,890 discloses polyacetal compositions including polymers having formaldehyde reactive nitrogen groups such as polyacrylamide. The use of epoxidized fatty acid stabilizer as polyoxymethylene stabilizers has been disclosed in U.S. Pat. App. Pub. No. 2005/0288438. U.S. Pat. No. 5,418,286 discloses a polyacetal resin with certain epoxy-containing polymer compounds. U.S. Pat. No. 5,866,671 discloses polyacetal compositions having organic cyclic compound, including hydantoin compounds, exhibiting liberation of low concentrations of formaldehyde. U.S. Pat. App. Pub. No. 2007/0078204 discloses a polyacetal resin composition and article thereof comprising a hydrazide compound having reduced emission of formaldehyde.

SUMMARY OF INVENTION

Described herein are polyacetal compositions comprising:

a) 20 to 80 weight percent polyacetal polymer, the polymer being homopolymer, copolymer, or mixtures of these;

b) 5 to 40 weight percent glass fiber;

c) 0.1 to 2 weight percent polymeric thermal stabilizer selected from the group consisting of a polyacrylamide, a polymethacrylamide, and mixtures of these;

d) 0.02 to 2 weight percent allantoin;

e) 0.1 to 5 weight percent of an ethylene copolymer of the formula E/X/Y, wherein each of the a) to e) components is based on the weight of the composition; and wherein:

E comprises 40 to 90 weight percent of the ethylene copolymer and is the radical formed from ethylene;

X comprises 10 to 40 weight percent of the ethylene copolymer and is a radical formed from monomers selected from the group consisting of $CH_2{=}CH(R^1){-}C(O){-}OR^2$, wherein $R^1$ is H, $CH_3$ or $C_2H_5$, $R^2$ is an alkyl group having 1-8 carbon atoms, vinyl acetate, or a mixture of these; and Y comprises 0.5 to 20 weight percent of the ethylene copolymer and is a radical formed from monomers selected from the group consisting of

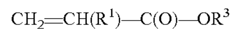

$$CH_2{=}CH(R^1){-}C(O){-}OR^3$$

wherein $R^3$is glycidyl, and $R^1$ is $R^1$ is H, $CH_3$ or $C_2H_5$.

Also described herein are articles molded from these compositions.

DETAILED DESCRIPTION OF INVENTION

Definitions

The following definitions are to be used for interpreting the terms in this description and in the claims.

As used herein, “a” refers to both a singular and a plural entity and means one or more than one and includes the concept of at least one.

Described herein are polyacetal compositions that comprise a) 20 to 80 weight percent polyacetal polymer, the polymer being homopolymer, copolymer, or mixtures of these;

b) 5 to 40 weight percent glass fiber;

c) 0.1 to 2 weight percent polymeric thermal stabilizer selected from the group consisting of a polyacrylamide, a polymethacrylamide, and mixtures of these;

d) 0.02 to 2 weight percent allantoin;

e) 0.1 to 5 weight percent of an ethylene copolymer of the formula E/X/Y, wherein each of the a) to e) components is based on the weight of the composition; and wherein:

E comprises 40 to 90 weight percent of the ethylene copolymer and is the radical formed from ethylene;

X comprises 10 to 40 weight percent of the ethylene copolymer and is a radical formed from monomers selected from the group consisting of $CH_2{=}CH(R^1){-}C(O){-}OR^2$, wherein $R^1$ is H, $CH_3$ or $C_2H_5$, $R^2$ is an alkyl group having 1-8 carbon atoms, vinyl acetate, or a mixture of these; and Y comprises 0.5 to 20 weight percent of the ethylene copolymer and is a radical formed from monomers selected from the group consisting of $CH_2{=}CH(R^1){-}C(O){-}OR^3$ wherein $R^3$ is glycidyl, and $R^1$ is $R^1$ is H, $CH_3$ or $C_2H_5$.

Polyacetal compositions are also known as polyoxymethylene or POM compositions and can be one or more homopolymers, copolymers, or a mixture of these. The polyoxymethylenes (or polyacetal) polymers described herein can be branched or linear and generally have a number average molecular weight of at least 10,000, preferably 20,000 to 90,000. The molecular weight may be measured by: 1) gel permeation chromatography in m-cresol at 160° C. using a DuPont PSM bimodal column kit with nominal pore size of 60 and 1000 angstrom; or 2) determining the melt flow using ASTM D1238 or ISO 1133. For injection molding purposes, the melt flow is typically in the range of 0.1 to 100 g/min, preferably from 0.5 to 60 g/min, or more preferably from 0.8 to 40 g/min. Other manufacturing processes that result in films or fibers as well as blow molding may give different melt viscosity ranges.

Homopolymers

Polyacetal homopolymers are prepared by polymerizing formaldehyde or formaldehyde equivalents, such as cyclic oligomers of formaldehyde. Preferred are homopolymers having terminal hydroxyl groups that are-capped by a chemical reaction to form ester or other groups. Preferred end groups for hompolymers are acetate and methoxy.

Polyacetal copolymers can contain one or more typical co-monomers, which include acetals and cyclic ethers that lead to the incorporation into the polymer chain of ether units with 2 to 12 sequential carbon atoms. When these compositions include such a copolymer, the quantity of co-monomer will not be more than 20 weight percent, preferably not more than 15 weight percent, and most preferably about two weight percent. Preferable co-monomers include ethylene oxide, butylene oxide and, more preferably 1,3-dioxolane. In general, preferable polyoxymethylene copolymers are those for which the quantity of co-monomer is about 2 weight percent and are not completely end-capped, but have some free hydroxy ends from the co-monomer unit or are terminated with ether groups. Preferred end groups for copolymers are hydroxy and methoxy.

Glass Fiber

Also suitable in the compositions described herein is any glass fiber appropriately chopped and sized for handling and adhesion to the polyacetal polymer. Preferably 5 to 40 weight percent and more preferably 20 to 40 weight percent glass fiber is used in the compositions described herein.

Preferably, the glass fiber is E-glass of about 3 to 20 micron in diameter, more preferably about 10 to 15 micron in diameter, and about 3 millimeter (mm) in length. The fiber is preferably treated with a silane coupling agent to improve compatibility with the thermoplastic.

Suitable silane coupling agents have the general formula:

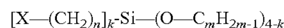

$$[X—(CH_2)_n]_k\text{-Si—}(O—C_mH_{2m-1})_{4-k}$$

where: X is —$NH_2$, —OH, or glycidyl, n is a whole number from 2 to 10, preferably 3 to 4, m is a whole number from 1 to 5, preferably 1 to 2, and k is a whole number from 1 to 3, preferably 1.

Preferred silane compounds include aminopropyltrimethoxysilane, aminobutyltrimethoxysilane, aminopropyltriethoxysilane and aminobutyltriethoxysilane, and also the corresponding silanes which comprise a glycidyl group as substituent X.

The amounts of the silane compounds generally used for surface-coating are from 0.05 to 5% by weight, preferably from 0.5 to 1.5% by weight and in particular from 0.8 to 1 % by weight (based on the weight of glass fiber.)

Polymeric Thermal Stabilizers

Polymeric thermal stabilizers useful in these compositions include polyacrylamide, polymethacrylamide, and mixtures of these are homopolymers or copolymers that do not melt at polyacetal melt-processing temperatures, such as those at which extrusion occurs, and have a suitably small particle size such as an average particle size of less than 10 micron before melt blending with polyacetal, as disclosed in U.S. Pat. No. 5,011,890, hereby incorporated herein by reference.

Preferably, the polymer thermal stabilizer is prepared from the relevant monomer—either acrylamide or methacrylamide—by free radical polymerization and comprises at least 75 mole percent of units derived from the relevant monomer. More preferably, it comprises at least 90 mole percent of the above units, even more preferably, it comprises at least 95 mole percent of the above units, and yet more preferably, it comprises at least 99 mole percent of the above unit.

When polymerized from different monomers termed co-monomers, the polymeric thermal stabilizer becomes a copolymer. The co-monomers may or not contain formaldehyde reactive nitrogen groups. Examples of other monomers that may be thus incorporated include styrene, ethylene, alkyl acrylates, alkyl methacrylates, N-vinylpyrrolidone, and acrylonitrile. The polymeric thermal stabilizer that is a copolymer must still be non-meltable at polyacetal melting processing temperatures, possess the required quantity of formaldehyde reactive nitrogen groups in the required ratio, and have the required number average particle size as disclosed above. Preferably, the co-monomer should be added such that it does not unduly minimize either the number of moles of formaldehyde reactive groups per gram of polymeric stabilizer or the number of formaldehyde reactive sites per gram of polymeric stabilizer. Preferred, copolymeric thermal stabilizers include copolymers of hydroxypropyl methacrylate with acrylamide, methacrylamide, or dimethylaminoethyl methacrylate. Preferably the polyacrylamide or polymethacrylamide are homopolymers.

Allantoin

Allantoin, CAS [97-59-6] reduces the amount of volatile organic compound, specifically formaldehyde, emitted from the composition under specific thermal processing conditions. Any commercial source of allantoin may be used. Preferably the allantoin has a purity greater than 95 weight percent, preferably higher than 98 weight percent. Preferably the total metal content is less than 0.01 weight percent and the pH of a 5 weight percent dispersion of allantoin in water is no less than 5.4.

Ethylene Co-Polymer

The ethylene copolymer useful in the invention is of the formula E/X/Y wherein

E is the radical formed from ethylene and comprises 40 to 90 weight percent of the ethylene copolymer;

X is a radical formed from monomers selected from the group consisting of $CH_2{=}CH(R^1)—C(O)—OR^2$ and comprises 10 to 40 weight percent of the ethylene copolymer, wherein $R^1$ is H, $CH_3$ or $C_2H_5$, preferably $R^1$ is H or $CH_3$, and most preferably $R^1$ is H; $R^2$ is an alkyl group having 1-8 carbon atoms; vinyl acetate; or a mixture thereof; and Y is a radical formed from monomers selected from the group consisting of $CH_2{=}CH(R^1)—C(O)—OR^3$ and comprises 0.5 to 20 weight percent, and preferably about 1 to 5 weight percent, of the ethylene copolymer wherein $R^3$ is glycidyl, and $R^1$ is $R^1$ is as described above as for X.

Preferably the ethylene copolymer is used in the compositions described herein in a range of 0.1 to 5 weight percent, and preferably 0.1 to 2 weight percent of the total composition. It is hypothesized but not known with certainty that the function of the ethylene copolymer is that of an acid scavenger.

Suitable ethylene copolymers for the compositions of the invention are Elvaloy® PTW copolymer available from E.I. du Pont de Nemours and Company, Wilmington, Del. and ethylene/n-butyl acrylate/glycidyl methacrylate terpolymer derived from radical polymerization having a melt index of 8 g/10 minutes as measured by ASTM method D1238.

Using the Compositions Described Herein

Also described herein are articles comprising the compositions described herein, which have been molded using any suitable melt-processing technique. Commonly used melt-molding methods include extrusion molding, blow molding, preferably injection blow molding and more preferably injection molding. Molded articles include gears, toys, and lighter and pen bodies.

The compositions described herein may be extruded into films and sheets to prepare both cast and blown films. The extruded sheets may be further thermoformed into articles and structures that may be oriented from the melt or at a later stage in the processing.

The compositions described herein may also be used to form fibers and filaments that may be oriented from the melt or at a later stage in the processing of the composition.

EXAMPLES

Materials

The following materials were used in formulating the polyacetal resin compositions disclosed in Examples 1 to 6 and Comparative Ex. C1 to C17).

POM-A: A combination of: 98.91 part of polyoxymethylene homopolymer (Melt flow rate: 20.5 g/min);

0.95 part polyacrylamide thermal stabilizer, 0.07 part of Irganox® 245FF hindered phenolic stabilizer (supplied by Ciba Specialty Chemicals, Ardsley, N.Y.); and 0.07 part of polyethyleneglycol (Mw=6000);

added to a twin-screw extruder, along with other ingredients listed in the various tables that follow.

Chopped E-glass fiber (GF), about 10 micron in diameter, and about 3 mm average length surface treated with a silane coupling agent, available from Nippon Sheet Glass, product number TPA0331.

Elvaloy® PTW copolymer is a terpolymer of ethylene, n-butylacrylate (nBA) and glycidylmethacrylate (GMA) respectively, available from E.I. du Pont de Nemours and Company, Wilmington, Del.

5,5-dimethylhydantoin (DMH) CAS [77-71-4] available from Aldrich Chemical Co.

Allantoin, CAS [97-59-6] available from DSM Deretil.

Poly(acrylamide) (PA) thermal stabilizer: prepared via conventional dispersion polymerization of acrylamide monomer (100 g) and poly(ethyleneglycol) [$M_w$=8,000] dispersant/stabilizer (15 g) in methanol (500 mL), at a temperature of 71° C.

Polymerization was initiated via addition of azobisisobutyronitrile (0.04 g) under mechanical stirring, followed by repeated addition of five subsequent initiator aliquots, 0.02 g each, spaced every 20 minutes. After 3 h of stirring, the resulting stabilizer mixture was isolated as a free flowing white powder (<0.25 μm particle diameter) via direct spray drying.

Methods

Measurement of Melt Flow Rate

The melt flow rate of pellet samples was measured by ISO1133 at 190° C. under 2.16 kg weight.

Determination of Thermal Stability at Melt Condition 1.0 gram of each pellet sample was melted for 30 minutes at 220° C. in a nitrogen atmosphere. The formaldehyde gas generated by the decomposition of the sample was introduced into a 4% aqueous sodium bisulfite solution and titrated with a 0.1 N hydrochloric acid. The amount of formaldehyde gas generated was expressed by the following formula:

$$\text{Amount of formaldehyde formed (\%)}=30.03\ NV/S\times 100$$

wherein V was the amount of 0.1N HCl in ml, required for titrating after 30 minutes, N was the normality, S was the amount of sample, in grams, and 30.03 was the molecular weight of formaldehyde. A smaller calculated result indicated better melt stability in melt state with less degradation in melt state.

Measurement of Amount of Volatilized Formaldehyde (VOC-A)

Each of the pellets obtained in the examples and comparative examples were molded into 100×80×2 mm plates using a 2.8-ounce injection molding machine (Sumitomo Heavy Metal Industries, SE100D) under standard molding conditions for polyacetal resins. After cooling in air, the plate was placed in a paper bag internally coated with aluminum, sealed and allowed to stand for 1 week at room temperature. The plates were removed from the bag and placed in a 4-liter Tedlar® bag filled with 2 liters of nitrogen gas, and the Tedlar® bag placed in an oven heated at 65° C. and left in the oven for 2 h. After removing from the oven, all of the gas inside was fed into a formaldehyde absorption cartridge (GL-PaK mini AERO DNPH) to absorb the formaldehyde. The amount of formaldehyde was then measured by liquid chromatography using acetonitrile-water (60:40) for the mobile phase at a detection wavelength of 350 nm. The results were obtained by dividing the total amount of volatilized formaldehyde by the weight of the test piece in ppm.

Measurement of Amount of Volatilized Formaldehyde (VOC-B)

Volatile formaldehyde from molded parts were also measured under the method specified by VDA275. Each of the pellets obtained in the examples and in comparative examples were molded into 100×40×2 mm plates using a 2.8-ounce injection molding machine (Sumitomo Heavy Metal Industries, SE100D) under standard molding conditions for polyacetal resins. After cooling in air, the plate was placed in a paper bag internally coated with aluminum, after which the paper bag was sealed and allowed to stand for 1 week at room temperature. The plates were removed from the bags and the plate was hung in the upper part of 1-liter polyethylene bottle, charged by 50 ml of water at the bottom. This bottle was then placed in an oven heated at 60° C. and left in the oven for 3 hours. After removing the bottle from the oven, the water was collected. The formaldehyde in the water was then treated with acetyl-acetone and measured with UV spectrometer with the wavelength of 412 nm. The results were obtained by dividing the total amount of volatilized formaldehyde by the weight of the test piece in ppm.

Example 1

POM-A (93.9 kg), chopped glass fiber (5.0 kg), allantoin (0.1 kg) and Elvaloy® PTW copolymer (1.0 kg ) were blended and extruded with 65 mm twin extruder at the melt temperature of 210-220° C., with the production rate of ca. 220 kg/hr. The extruded strands were cut into small pellet form and designated POM- A 5% GF.

Comparative Examples 1 to 3

In the same manner as in Example 1, Comparative examples C1 through C3 were prepared using the compositions listed in Table 1.

Example 2

POM-A (73.9 kg), chopped glass fiber (25.0 kg), allantoin (0.1 kg) and Elvaloy® PTW copolymer (1.0 kg ) were blended and extruded with 65 mm twin extruder at the melt temperature of 210-220° C., with the production rate of ca.

220 kg/hr. The extruded strands were cut into small pellet form and designated POM-A 25% GF.

Example 3 and Comparative Examples 4 to 8

In the same manner as in Example 2, Example 3 and Comparative examples C4 through C8 were prepared using compositions listed in Table 2.

Example 4, Comparative Examples 9 to 11

The sample of Example 4 was prepared by blending pellets prepared in Example 1 with those prepared in Example 2 to provide a composition having the glass fiber content adjusted to 1 0 weight percent, listed in Table 3.

The comparative examples C9 through C11 were also prepared in same manner, by pellet blending, respectively, of the composition of Comparative example C1 with that of C4, of the composition of Comparative example C2 with that of C5, and o the composition of Comparative example C3 with that of C6. as listed in Table 3.

Example 5 and Comparative Examples C12 to C14

These samples were also prepared by pellet blending the pellets prepared in Example 1 with those prepared in Example 2 in blending ratios such that the glass fiber content was equal to 15%, listed in Table 4. Comparative Examples C12 through C14 were also prepared in the same manner, by pellet blending, respectively, of the composition of Comparative example C1 with that of C-4, of the composition of Comparative example C2 with that of C5, and of the composition of Comparative example C3 with that of C6 to provide samples with glass fiber content equal to 15 weight percent. listed in Table 4.

Example 6, and Comparative Examples C15 to C17

These samples were prepared by pellet blending the pellets prepared in Example 1 with those prepared in Example 2 in blending ratios such that the glass fiber content was equal to 18.5 weight percent, listed in Table 5 Comparative examples C15 through C17 were also prepared in the same manner, by pellet blending, respectively, of the composition of Comparative example C1 with that of C-4, of the composition of Comparative example C2 with that of C-5, and of the composition of Comparative example C3 with that of C6 to provide samples with glass fiber content equal to 18.5 weight percent, listed in Table 5.

TABLE 1

5 wt % Glass Composition

| | Example No. | | | |
|---|---|---|---|---|
| | 1 | C-1 | C-2 | C-3 |
| POM (A) wt % | 93.90 | 95.00 | 94.90 | 94.00 |
| Allantoin Wt % | 0.10 | | 0.10 | |
| Elvaloy ® PTW | 1.00 | | | 1.00 |
| GF content Wt % | 5.0 | 5.0 | 5.0 | 5.0 |
| Properties | | | | |
| Melt Flow Rate g/10 min | 21.1 | 17.4 | 16.4 | 19.2 |
| Melt Stability wt % | 0.05 | 2.19 | 0.25 | 0.08 |

TABLE 1-continued 5 wt % Glass Composition

| | Example No. | | | |
|---|---|---|---|---|
| | 1 | C-1 | C-2 | C-3 |
| VOC Test (A) Ppm | 1.3 | 10.3 | 6.0 | 10.6 |

TABLE 2

25 wt % Glass Composition

| | Example | | | | | | |
|---|---|---|---|---|---|---|---|
| | 2 | 3 | C-4 | C-5 | C-6 | C-7 | C-8 |
| POM (A) wt % | 73.9 | 73.9 | 75.0 | 74.9 | 74.0 | 73.9 | 74.9 |
| allantoin wt % | 0.1 | 0.075 | | 0.1 | | | 0.075 |
| DMH wt % | | 0.025 | | | | 0.1 | 0.025 |
| Elvaloy ® PTW | 1.0 | 1.0 | | | 1.0 | 1.0 | |
| GF content wt % | 25.0 | 25.0 | 25.0 | 25.0 | 25.0 | 25.0 | 25.0 |
| Melt Flow Rate g/10 min | 7.2 | 7.8 | 8.2 | 7.6 | 7.0 | 7.5 | 7.7 |
| Melt Stability wt % | 0.15 | 0.22 | 0.22 | 0.21 | 0.11 | 0.14 | 0.27 |
| VOC Test (A) Ppm | 0.7 | 1.1 | 6.8 | 1.7 | 6.7 | 3.7 | 2.0 |
| VOC Test (B) Ppm | 5.36 | 6.85 | 22.6 | 9.31 | 15.1 | 14.7 | 11.2 |

TABLE 3

10 wt % Glass Composition

| | Example No. | | | |
|---|---|---|---|---|
| | Example-4 | C--9 | C-10 | C-11 |
| POM (A) wt % | 88.90 | 90.00 | 89.90 | 89.00 |
| Allantoin wt % | 0.10 | | 0.10 | |
| Elvaloy ® PTW | 1.00 | | | 1.00 |
| GF content wt % | 10.0 | 10.0 | 10.0 | 10.0 |
| Melt Flow Rate g/10 min | 15.4 | 14.4 | 14.0 | 13.4 |
| Melt Stability wt % | 0.07 | 1.28 | 0.33 | 0.11 |
| VOC Test (A) Ppm | 1.9 | 9.5 | 7.7 | 10.7 |

TABLE 4

15 wt % Glass Composition

| | Example No. | | | |
|---|---|---|---|---|
| | 5 | C-12 | C-13 | C-14 |
| POM (A) wt % | 83.90 | 85.00 | 84.90 | 84.00 |
| Allantoin wt % | 0.10 | | 0.10 | |

TABLE 4-continued

| 15 wt % Glass Composition | | | | |
|---|---|---|---|---|
| | Example No. | | | |
| | 5 | C-12 | C-13 | C-14 |
| Elvaloy ® PTW | 1.00 | | | 1.00 |
| GF content Wt % | 15.0 | 15.0 | 15.0 | 15.0 |
| Melt Flow Rate g/10 min | 10.7 | 11.9 | 11.1 | 11.2 |
| Melt Stability Wt % | 0.09 | 0.72 | 0.24 | 0.10 |
| VOC Test (A) ppm | 2.2 | 9.5 | 6.5 | 10.3 |

TABLE 5

| 18.5 wt % Glass Composition | | | | |
|---|---|---|---|---|
| | Example No. | | | |
| | 6 | C-15 | C-16 | C-17 |
| POM (A) Wt % | 80.4 | 81.5 | 81.4 | 80.5 |
| Allantoin Wt % | 0.1 | | 0.1 | |
| Elvaloy ® PTW Wt % | 1.0 | | | 1.0 |
| GF content Wt % | 18.5 | 18.5 | 18.5 | 18.5 |
| Melt Flow Rate g/10 min | 9.5 | 10.7 | 9.8 | 10.1 |
| Melt Stability Wt % | 0.09 | 0.62 | 0.30 | 0.11 |
| VOC Test (A) ppm | 2.6 | 10.4 | 7.4 | 10.6 |

The results indicate that the glass reinforced POM composition containing polyacrylamide, Elvaloy® PTW, and allantoin, exhibits, at all levels of glass reinforcement tested, significantly lower VOC than comparative examples having polyacrylamide and Elvaloy® PTW, or polyacrylamide and allantoin.

Further, comparison of Example 2 and C7 shows that allantoin has a significant improvement in VOC over a similar composition using 5,5-dimethylhydantoin in place of allantoin. Thus, allantoin exhibits an unexpected and surprising improvement in VOC stability, relative to 5,5-dimethylhydantoin.

What is claimed is:

1. A polyacetal thermoplastic composition comprising:

a) 20 to 80 weight percent polyacetal polymer,
  the polymer being homopolymer, copolymer, or mixtures of these;

b) 5 to 40 weight percent glass fiber;

c) 0.1 to 2 weight percent polymeric thermal stabilizer selected from the group consisting of a polyacrylamide, a polymethacrylamide, and mixtures of these;

d) 0.02 to 2 weight percent allantoin;

e) 0.1 to 5 weight percent of an ethylene copolymer of the formula E/X/Y, wherein each of the a) to e) components is based on the weight of the composition; and wherein:

E comprises 40 to 90 weight percent of the ethylene copolymer and is the radical formed from ethylene;

X comprises 10 to 40 weight percent of the ethylene copolymer and is a radical formed from monomers selected from the group consisting of $CH_2{=}CH(R^1){-}C(O){-}OR^2$,
  wherein $R^1$ is H, $CH_3$ or $C_2H_5$, $R^2$ is an alkyl group having 1-8 carbon atoms, vinyl acetate, or a mixture of these; and Y comprises 0.5 to 20 weight percent of the ethylene copolymer and is a radical formed from monomers selected from the group consisting of $$CH_2{=}CH(R^1){-}C(O){-}OR^3$$

wherein $R^3$ is glycidyl, and $R^1$ is $R^1$ is H, $CH_3$ or $C_2H_5$.

2. The thermoplastic composition of claim 1 having 20 to 40 weight percent of the glass fiber; and 0.1 to 2 weight percent of the ethylene copolymer of the formula E/X/Y.

3. The composition of claim 1 wherein the polymeric thermal stabilizer is polyacrylamide.

4. A molded article comprising the composition of claim 1.

* * * * *